(12) United States Patent
Lee et al.

(10) Patent No.: US 9,056,420 B2
(45) Date of Patent: Jun. 16, 2015

(54) DRAW PRESS SYSTEM

(71) Applicant: Hyundai Motor Company, Seoul (KR)

(72) Inventors: Seung Jik Lee, Ulsan (KR); Jong Kun Cho, Ulsan (KR); Joo Han Bae, Ulsan (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/099,815

(22) Filed: Dec. 6, 2013

(65) Prior Publication Data

US 2014/0186481 A1    Jul. 3, 2014

(30) Foreign Application Priority Data

Dec. 28, 2012  (KR) .................. 10-2012-0157510

(51) Int. Cl.
| | | |
|---|---|---|
| B29C 33/20 | (2006.01) | |
| B29C 33/26 | (2006.01) | |
| B29C 51/04 | (2006.01) | |
| B29C 51/08 | (2006.01) | |
| B29C 51/26 | (2006.01) | |
| B21D 22/02 | (2006.01) | |
| B21D 25/00 | (2006.01) | |

(52) U.S. Cl.
CPC .............. B29C 51/04 (2013.01); B29C 51/082 (2013.01); B29C 51/262 (2013.01); B21D 22/02 (2013.01); B21D 25/00 (2013.01)

(58) Field of Classification Search
CPC .... B29C 51/04; B29C 51/082; B29C 51/262; B29C 51/165; B29C 31/008; B30B 11/00
USPC ......... 425/140, 149, 150, 390, 394–398, 403, 425/518–521; 264/291, 294
See application file for complete search history.

(56) References Cited

U.S. PATENT DOCUMENTS

| | | | | |
|---|---|---|---|---|
| 3,784,342 | A * | 1/1974 | Merklinghaus | 425/292 |
| 4,228,121 | A * | 10/1980 | Meadors | 425/389 |
| 5,718,791 | A * | 2/1998 | Spengler | 156/212 |
| 6,527,687 | B1 * | 3/2003 | Fortney et al. | 493/56 |
| 7,152,296 | B2 * | 12/2006 | Saelen et al. | 425/510 |
| 7,699,595 | B2 * | 4/2010 | Spengler | 425/149 |
| 8,734,309 | B2 * | 5/2014 | Johns et al. | 493/152 |

FOREIGN PATENT DOCUMENTS

JP          8-290219 A        5/1996

* cited by examiner

*Primary Examiner* — Joseph S Del Sole
*Assistant Examiner* — Thu Khanh T Nguyen
(74) *Attorney, Agent, or Firm* — Morgan, Lewis & Bockius LLP

(57) ABSTRACT

A draw press device may include a lower mold having a lower surface forming portion, a blank holder disposed outside the lower mold, an upper mold having an upper surface forming portion disposed at an upper side slider above an upper side of the lower mold, and a stretching forming portion that performs a stretching when both end portions of the material panel are grasped by a cam operation before shaping or pressing the material panel.

6 Claims, 7 Drawing Sheets

DRAW PRESS SYSTEM

CROSS-REFERENCE TO RELATED APPLICATION

The present application claims priority of Korean Patent Application Number 10-2012-0157510 filed Dec. 28, 2012, the entire contents of which application are incorporated herein for all purposes by this reference.

BACKGROUND OF INVENTION

1. Field of Invention

The present invention relates to a draw press device that improves quality and strength of a panel when a panel is formed by a press process.

2. Description of Related Art

Generally, in a press processing, a plane material panel is disposed on a lower mold having pattern and an upper mold presses the panel on the lower mold to transform the panel.

For example, a vehicle maker develops 1000 or more body panels so as to make a vehicle, and a part of panel passes various press devices and goes through various processes such as a drawing process, a trimming process, a piercing process, a flanging process, a hemming process, and so on to be fabricated to a product panel. Here, the draw forming process plastically deforms material and more than 90% of the quality of the product panel is determined by the draw forming process.

Like this, a press device for a draw processing, as shown in FIG. 1, a lower mold 101 having a lower end surface shape of a product panel is mounted on a bolster 103 of a lower side, an upper mold 111 having an upper end surface shape of a product panel is mounted on a slider 109 of an upper side, and a panel is introduced between the lower mold 101 and the upper mold 111 to be pressed as a product panel.

In a draw press device as shown in FIG. 2, a lower mold 101 having a lower end surface shape of a product panel is mounted on a bolster 103 of a lower side, and a blank holder 107 is mounted on the bolster 103 disposed outside the lower mold 101 through a cushion pin 105.

And, an upper mold 111 having an upper end surface shape of a product panel on an upper side of the lower mold 101 is mounted on a slider 109 of an upper portion, and a material panel 113 that is introduced between the lower mold 101 and the upper mold 111 is pressed to be a product panel in a condition that a part of the material panel 113 is put on the blank holder 107.

However, a press device as describe above has a drawback that a curve is formed by a shortage of strength when forming a relatively wide panel product such as a door panel, a wood outer panel, a trunk rid outer panel, and a roof panel.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a draw press device having advantages of providing strength on a panel production and improving shape quality.

A draw press device that includes a lower mold having a lower surface forming portion, a blank holder disposed outside the lower mold, and an upper mold having an upper surface forming portion disposed at an upper side slider above an upper side of the lower mold, and that presses a material panel introduced between the upper mold and the lower mold to shape the material panel, the draw press device according to various aspects of the present invention may include a stretching forming portion that performs a stretching when both end portions of the material panel are grasped by a cam operation before shaping the material panel.

The stretching forming portion may include an upper mold cam that is slidably disposed on the upper mold and moves in an inside or an outside direction along a lower surface of the upper mold, wherein the upper mold cam includes a holding surface formed at a lower surface thereof, a lower mold cam that is slidably disposed on a slanted guide surface of an upper surface of the blank holder to grasp an end portion of the material panel together with the upper mold cam, a cylinder that is disposed on an outside of an upper surface of the upper mold to operate the upper mold cam in an inside or an outside direction, and a spring that is disposed on an outside of an upper surface of the blank holder to elastically support the lower mold cam in an inside direction.

The upper mold cam may be slidably disposed on a lower surface of the upper mold through a wear plate. The spring may be a gas spring.

A stroke block may be interposed between the lower mold cam and a side surface of the lower mold and guides the up/down direction movement of the lower mold cam.

The upper mold cam may include a guide portion that is formed at an outside end portion to guide the outside of the upper portion of the lower mold cam. The upper mold cam may include a guide portion that is formed at an outside end portion to guide an upper outside portion of the lower mold cam.

A draw press device that includes a lower mold and an upper mold disposed above an upper side of the lower mold according to various aspects of the present invention may include a stretching forming portion that is disposed at both sides of the upper mold, wherein the stretching forming portion grasps both end portions of a material panel that is introduced between the lower mold and the upper mold and stretches the material panel before the material panel is pressed by the upper mold and the lower mold.

The stretching forming portion may include an upper mold cam that is slidably disposed on both side lower surfaces of the upper mold, and includes a holding surface formed at a lower surface, a lower mold cam that is slidably disposed on a slanted guide surface of an upper surface of a blank holder that is disposed at a side surface of the lower mold and includes a holding surface formed at an upper surface to grasp both end portions of the material panel together with the upper mold cam, a cylinder that is disposed outside the upper mold to operate the upper mold cam in an inside or an outside direction, and a spring that is disposed outside the blank holder to elastically support the lower mold cam in an inside direction.

In various aspects of the present invention, after both end portions of a material panel is hold by the operation of a cam method that is disposed at both edge sides of an upper mold and a lower mold, the material panel is stretched and is formed by a draw processing such that the panel becomes strengthened and the outside quality thereof is improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
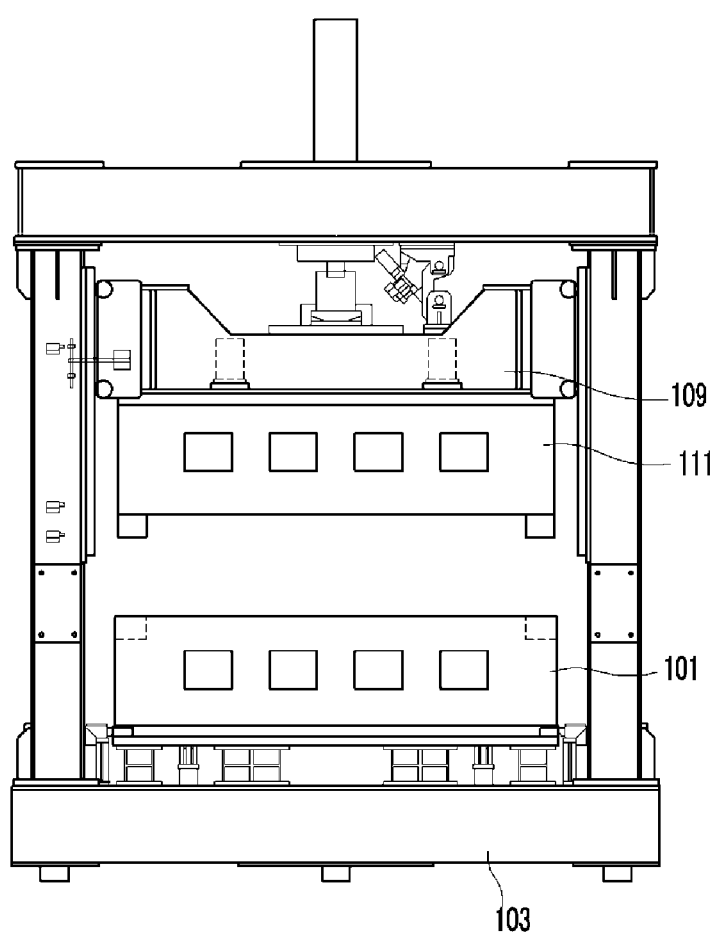
FIG. 1 is a side view of a press equipment.
Figure 2:
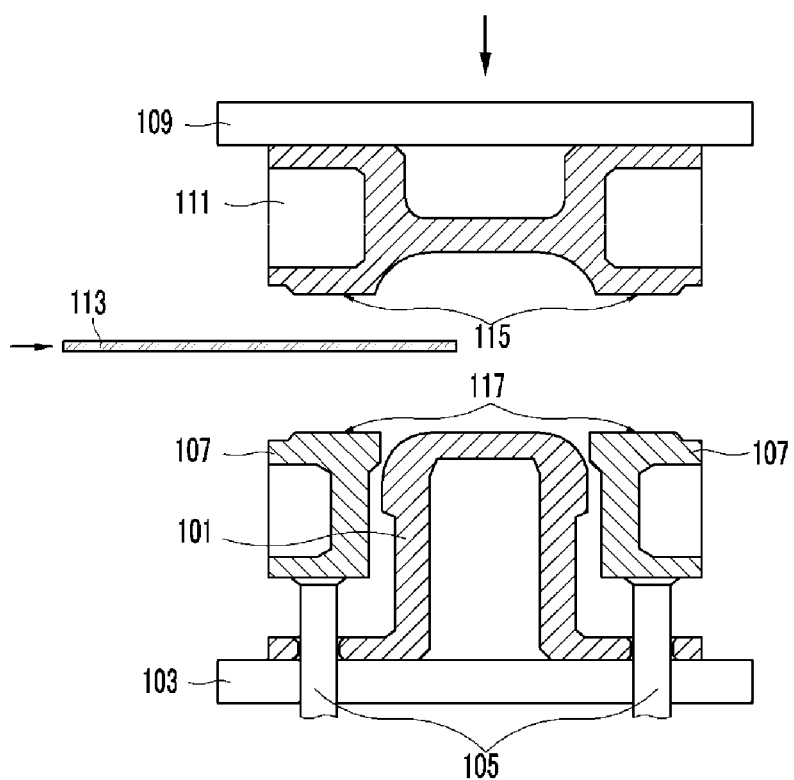
FIG. 2 is a schematic diagram of a draw press device for forming a panel.
Figure 3:
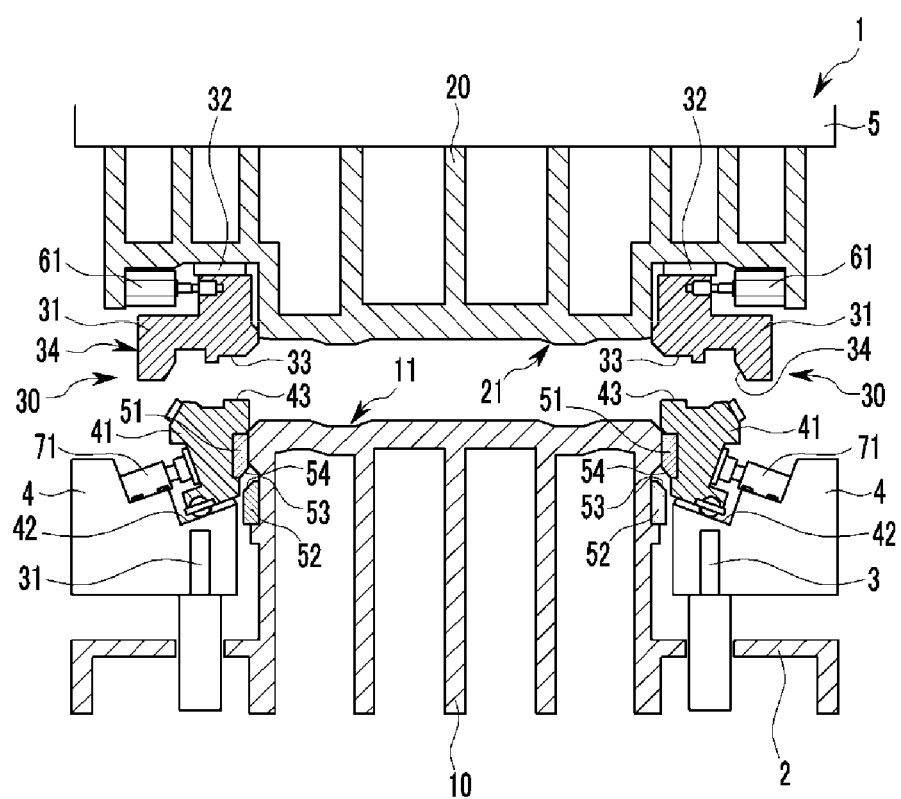
FIG. 3 is a schematic diagram of an exemplary draw press device according to the present invention.

FIG. 3 is a schematic diagram of a draw press device according to various embodiments of the present invention. Referring to FIG. 3, a draw press device 1 includes a lower mold 10 that is disposed on a bolster 2 of a lower side. The lower mold 10 has a lower surface forming portion 11 configured for the formation of a lower end surface shape of a product panel. The draw press device 1 also includes a blank holder 4 that is disposed on the bolster 2 through a cushion pin 3 at an outside of the lower mold 10.

And, an upper mold 20 that has an upper surface forming portion 21 is disposed on an upper side slider 5 above an upper portion of the lower mold 10. The upper surface forming portion 21 of the upper mold 20 is configured for the formation of an upper end surface shape of a product panel. The material panel 80 is supplied between the lower mold 10 and the upper mold 20 and pressed by the upper mold and/or the lower mold to be transformed to a product panel.

Also, a stretching forming portion 30 holds both end portions of the material panel 80 through a cam operation to perform a stretching forming before a draw forming The material panel is supplied between both side portions of the upper mold 20 and the blank holder 4.

The stretching forming portion 30 includes an upper mold cam 31, a lower mold cam 41, a cylinder 61, and a spring 71. The upper mold cam 31 is slidably disposed on both side lower surfaces of the upper mold 20 to move in an inside or an outside direction through a wear plate 32.

Also, a holding surface 33 is formed at a lower surface of the upper mold cam 31 and a guide portion 34 is formed at an inner side at an outside end portion of the upper mold cam 31 to guide an upper outside portion of the lower mold cam 41 in an inside direction.

The lower mold cam 41 is slidably disposed on a slanted guide surface 42 of both side upper surfaces of the blank holder 4 and a holding surface 43 is formed at an upper surface of the lower mold cam 41 to grasp or hold both end portions of the material panel 80 together with the upper mold cam 31.

Also, stroke blocks 51 and 52 are respectively interposed between the lower mold cam 41 and both side surfaces of the lower mold 10 to guide the up/down direction movement of the lower mold cam 41.

And, the stroke blocks 51 and 52 are a pair that includes an outside stroke block 51 that is disposed on the lower mold cam 41 and an inside stroke block 52 that is disposed on the lower mold 10. Cam surfaces 53 and 54 are respectively formed at an upper side of the inside stroke block 52 and a lower side of outside stroke block 51.

The cylinder 61 is disposed outside upper surfaces of both sides of the upper mold 20 to operate the upper mold cam 31 in an inner side or an outside direction.

The spring 71 is disposed at an outside of both side upper surfaces of the blank holder 4 to elastically support the lower mold cam 41 in an inside direction. Here, the spring 71 can be of a gas operation type, but it is not limited thereto in this invention.

Hereinafter, the operation of the draw press device having the above configuration will be described with reference to FIG. 4 to FIG. 7, which show operational conditions of a draw press device according to various embodiments of the present invention.

Figure 4:
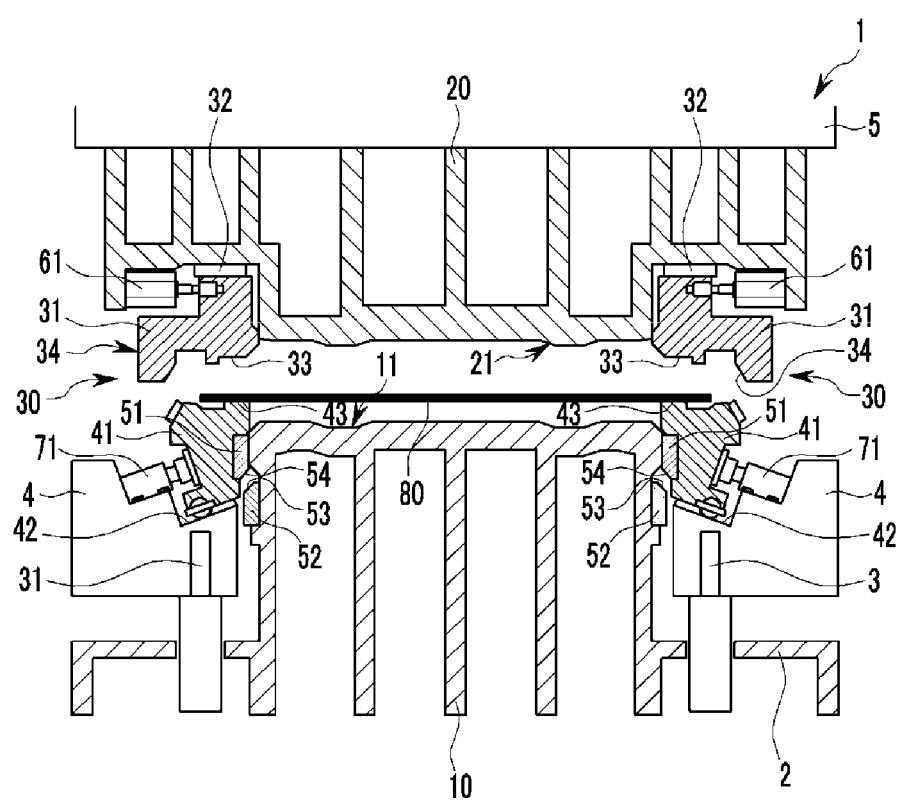
FIG. 4 to FIG. 7 show operational conditions of an exemplary draw press device according to the present invention.

First, referring to FIG. 4, the material panel 80 is supplied between the upper mold 20 and the lower mold 10 in a condition that the upper mold 20 and the blank holder 4 are lifted. Then, as shown in FIG. 5, the upper mold 20 is descended such that the outside end portion of the material panel 80 is grasped by the holding surface 33 of the upper mold cam 31 and the holding surface 33 of the lower mold cam 41.

Figure 5:
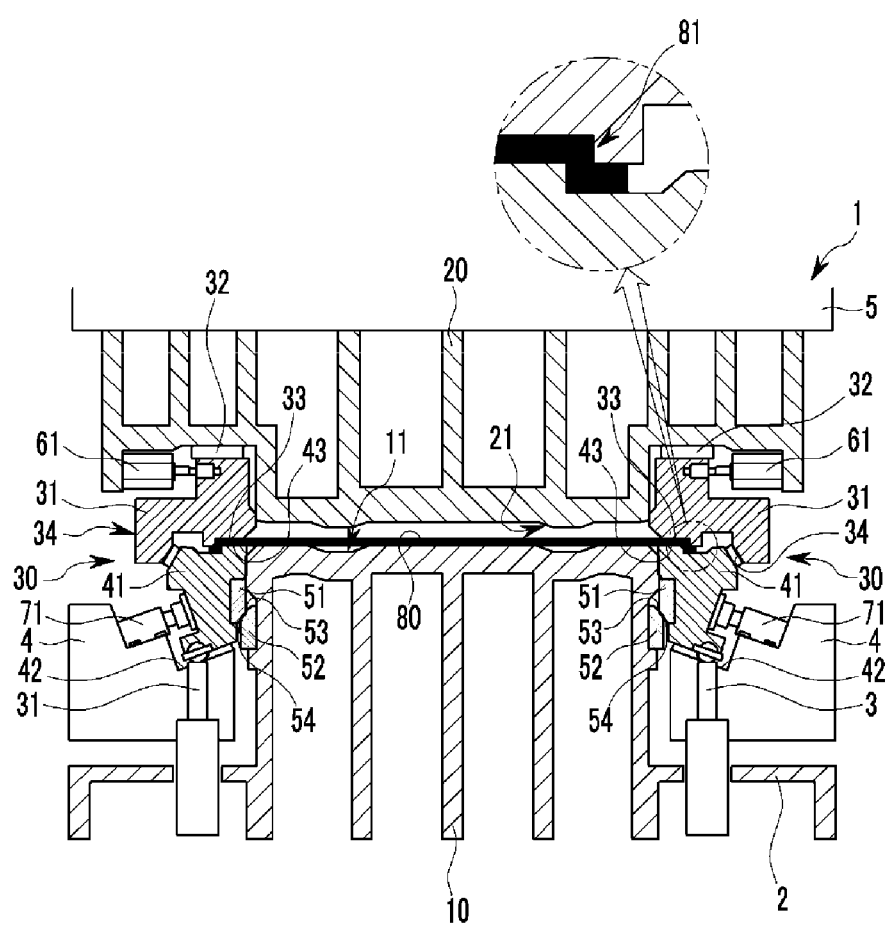

Here, when the outside end portion of the material panel 80 is hold by the upper mold cam 31 and the lower mold cam 41, a step bead 81 is simultaneously formed, and therefore strong supporting (tension) force can be applied during the stretching forming and simultaneously a material flow can be suppressed during a draw forming (refers to FIG. 5).

In this case, the guide portion 34 that is formed on the upper mold cam 31 supports the outside of the upper portion of the lower mold cam 41 and supports the lower mold cam 41 in an inner side direction.

Figure 6:
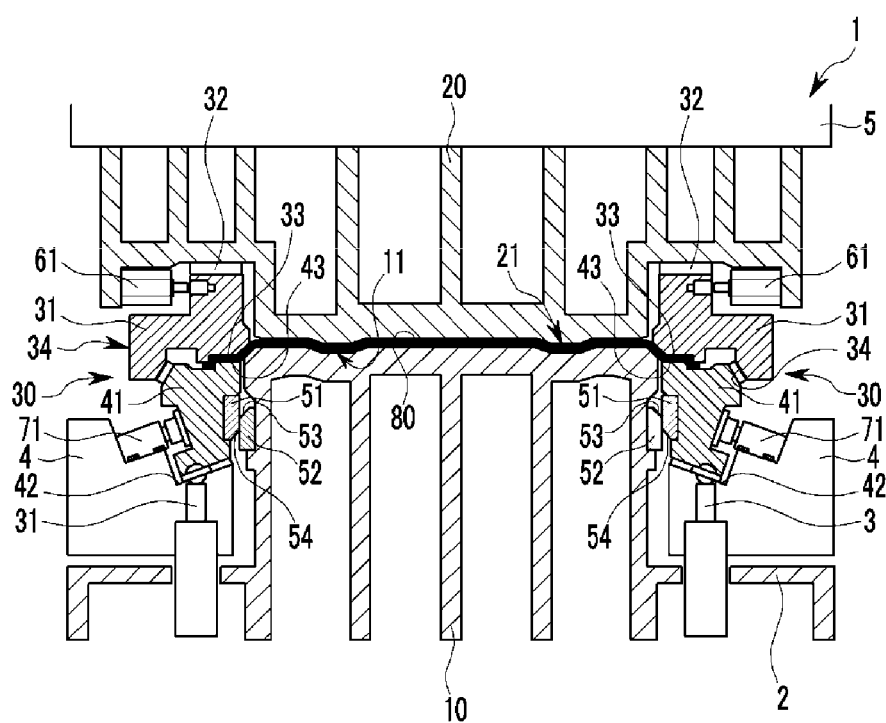

In this condition, as shown in FIG. 6, in accordance with the descent of the upper mold 20 and the blank holder 4, the lower mold cam 41 is pushed toward the outside by a cam structure of the cam surface 54 of the outside stroke block 51 and the cam surface 53 of the inside stroke block 52 such that both end portions of the material panel 80 is stretched in an outside direction.

In this process, the cylinder 61 pushes the upper mold cam 31 toward the inside of the upper mold 20 to press the material panel 80, and the spring 71 supporting the lower mold cam 41 sustains the contact force of the outside stroke block 51 and the inside stroke block 52. Accordingly, the descending upper mold 20 is engaged with the lower mold 10 and the stretched material panel 80 is transformed to a product panel through a draw forming The draw press device 1 holds both end portions of the material panel 80 through the upper mold cam 31 and the lower mold cam 41 that is configured between the upper mold 20 and the blank holder 4. After a stretching forming, a drawing forming is performed, and therefore a strength is effectively applied to the material panel 80 and simultaneously surface quality without refraction can be realized.

Figure 7:
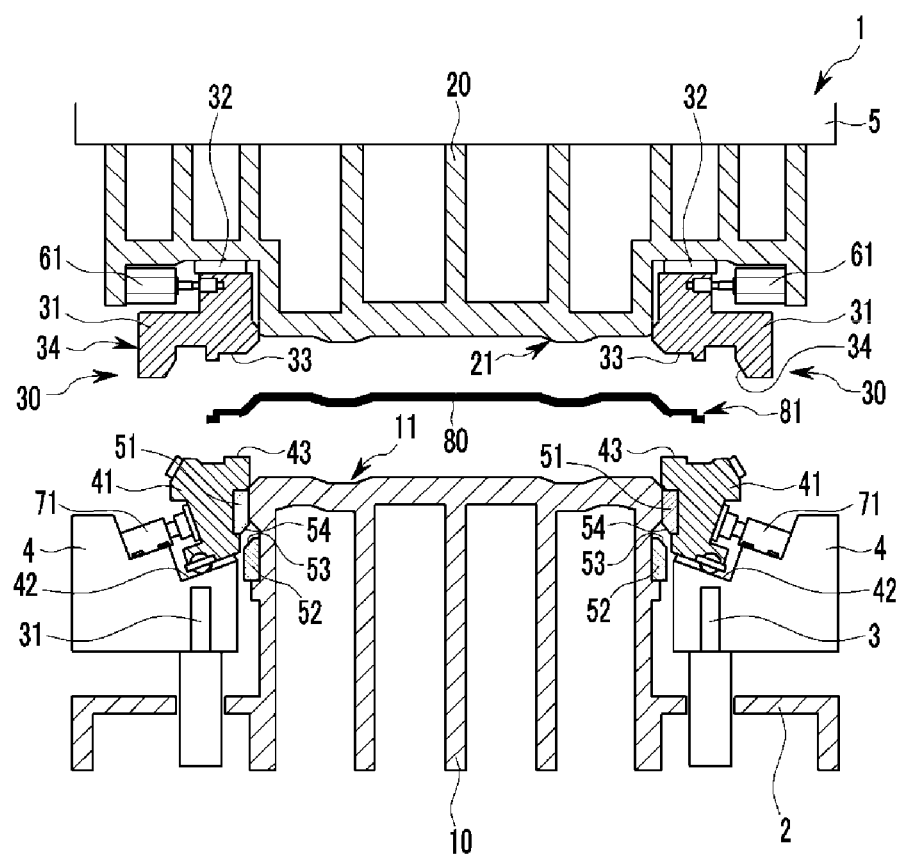

Once the forming is completed, the upper mold 20 is ascended and the material panel 80, as shown in FIG. 7, is lifted by the blank holder 4. The material panel 80 then is unloaded by an unload hanger.

For convenience in explanation and accurate definition in the appended claims, the terms "upper" or "lower", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A draw press device comprising:
   a lower mold having a lower surface forming portion;
   a blank holder disposed outside the lower mold and moveable in a lower direction based on the lower mold;
   an upper mold having an upper surface forming portion disposed at an upper side slider above an upper side of the lower mold, and that presses a material panel introduced between the upper mold and the lower mold to shape the material panel;
   a stretching forming portion that performs a stretching when both end portions of the material panel are grasped by a cam operation before shaping the material panel;
   an upper mold cam slidably disposed on the upper mold and moveable in an inside or an outside direction along a lower surface of the upper mold, wherein the upper mold cam includes a holding surface formed at a lower surface thereof;
   a lower mold cam slidably disposed on a slanted guide surface of an upper surface of the blank holder to grasp an end portion of the material panel together with the upper mold cam;
   a cylinder disposed on an outside of an upper surface of the upper mold to operate the upper mold cam in an inside or an outside direction; and
   a spring disposed on an outside of an upper surface of the blank holder to elastically support the lower mold cam in an inside direction,
   wherein a stroke block is interposed between the lower mold cam and a side surface of the lower mold to guide the up/down direction movement of the lower mold cam, and a cam surface is formed on the stroke block to move the lower mold cam in an outside direction.

2. The draw press device of claim 1, wherein the upper mold cam is slidably disposed on a lower surface of the upper mold through a wear plate.

3. The draw press device of claim 1, wherein the spring is a gas spring.

4. The draw press device of claim 1, wherein the upper mold cam includes a guide portion formed on an outside end portion to guide an upper outside portion of the lower mold cam.

5. A draw press device that includes a lower mold and an upper mold disposed above an upper side of the lower mold, the draw press device comprising:
   a stretching forming portion disposed at both sides of the upper mold, wherein the stretching forming portion grasps both end portions of a material panel that is introduced between the lower mold and the upper mold and stretches the material panel before the material panel is pressed by the upper mold and the lower mold,
   wherein the stretching forming portion includes a lower mold cam slidably disposed on a slanted guide surface of an upper surface of a blank holder disposed at a side surface of the lower mold, and
   wherein a stroke block is interposed between the lower mold cam and the side surface of the lower mold to guide the up/down direction movement of the lower mold cam, and a cam surface is formed on the stroke block to move the lower mold cam in an outside direction.

6. The draw press device of claim 5, wherein the stretching forming portion further includes:
   an upper mold cam slidably disposed on both side lower surfaces of the upper mold, and includes a holding surface formed at a lower surface;
   a cylinder disposed outside the upper mold to operate the upper mold cam in an inside or an outside direction; and
   a spring disposed outside the blank holder to elastically support the lower mold cam in an inside direction,
   wherein the lower mold cam includes a holding surface formed at an upper surface to gasp both end portions of the material panel together with the upper mold cam.

* * * * *